(12) United States Patent
Tiberghien et al.

(10) Patent No.: US 7,520,536 B2
(45) Date of Patent: Apr. 21, 2009

(54) CONNECTORS WITH ADJUSTABLE ELEMENTS TO PREVENT UNDESIRED COUPLING OF ADJACENT CONDUITS

(75) Inventors: Alain-Christophe Tiberghien, Faverges (FR); Rene Chappaz, Sevrier (FR)

(73) Assignee: Staubli Faverges, Faverges (FR)

( * ) Notice: Subject to any disclaimer, the term of this patent is extended or adjusted under 35 U.S.C. 154(b) by 0 days.

(21) Appl. No.: 11/069,965

(22) Filed: Mar. 3, 2005

(65) Prior Publication Data

US 2005/0194781 A1  Sep. 8, 2005

(30) Foreign Application Priority Data

Mar. 5, 2004  (FR) .................................. 04 02356

(51) Int. Cl.
  *F16D 35/00* (2006.01)
(52) U.S. Cl. ......................................... 285/93; 285/330
(58) Field of Classification Search .................. 285/93, 285/913, 914, 330; 292/252, DIG. 53, DIG. 64
  See application file for complete search history.

(56) References Cited

U.S. PATENT DOCUMENTS

| | | | | |
|---|---|---|---|---|
| 3,177,462 A | * | 4/1965 | Sarnmark | 439/681 |
| 3,287,031 A | * | 11/1966 | Simmons et al. | 285/27 |
| 3,509,515 A | * | 4/1970 | Acord | 439/258 |
| 3,614,711 A | * | 10/1971 | Anderson et al. | 439/314 |
| 3,829,816 A | * | 8/1974 | Barry et al. | 285/414 |
| 4,080,737 A | * | 3/1978 | Fleer | 433/126 |
| 4,111,514 A | * | 9/1978 | Brishka et al. | 439/680 |
| 4,407,529 A | * | 10/1983 | Holman | 285/82 |
| 4,619,640 A | * | 10/1986 | Potolsky et al. | 604/7 |
| 4,676,563 A | * | 6/1987 | Curlett et al. | 439/194 |
| 4,703,957 A | * | 11/1987 | Blenkush | 285/239 |
| 5,007,490 A | * | 4/1991 | Ide | 175/107 |
| 5,449,302 A | * | 9/1995 | Yarbrough et al. | 439/680 |
| 5,577,775 A | * | 11/1996 | Pearson et al. | 285/24 |
| 5,920,934 A | * | 7/1999 | Hannagan et al. | 5/713 |
| 5,971,019 A | * | 10/1999 | Imai | 137/614.04 |

FOREIGN PATENT DOCUMENTS

| | | |
|---|---|---|
| DE | 1187435 | 3/1960 |
| DE | 2646063 | 4/1977 |
| FR | 2065938 | 8/1971 |

* cited by examiner

*Primary Examiner*—Aaron M Dunwoody
(74) *Attorney, Agent, or Firm*—Dowell & Dowell, P.C.

(57) ABSTRACT

A connection for ensuring a correct coupling of two conduits including two connectors adapted to be fitted one within the other along an axis of fit and which connectors include initially engageable portions that permit a controlled angular indexing of the two connectors as they are initially brought into engagement and which further include selectively adjustable elements that prevent a complete joining of the connectors if at least one of the adjustable elements of one of the connectors is positioned to block an opposing adjustable element of the other connector.

13 Claims, 3 Drawing Sheets

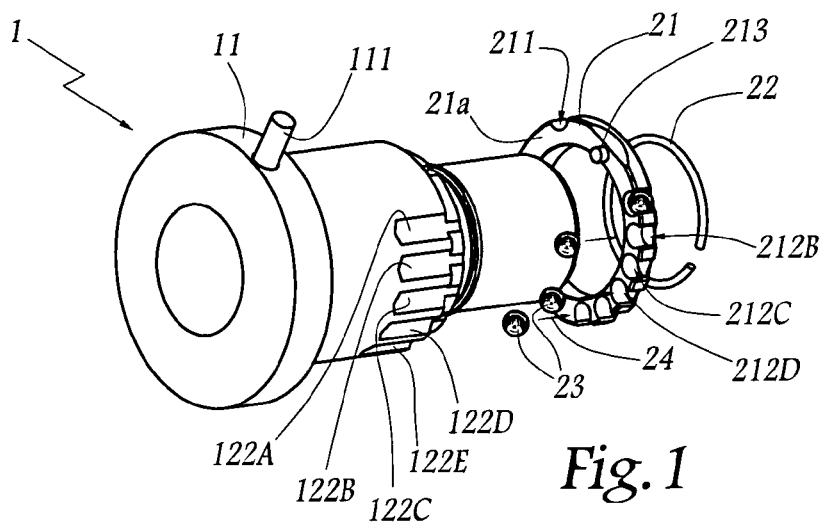
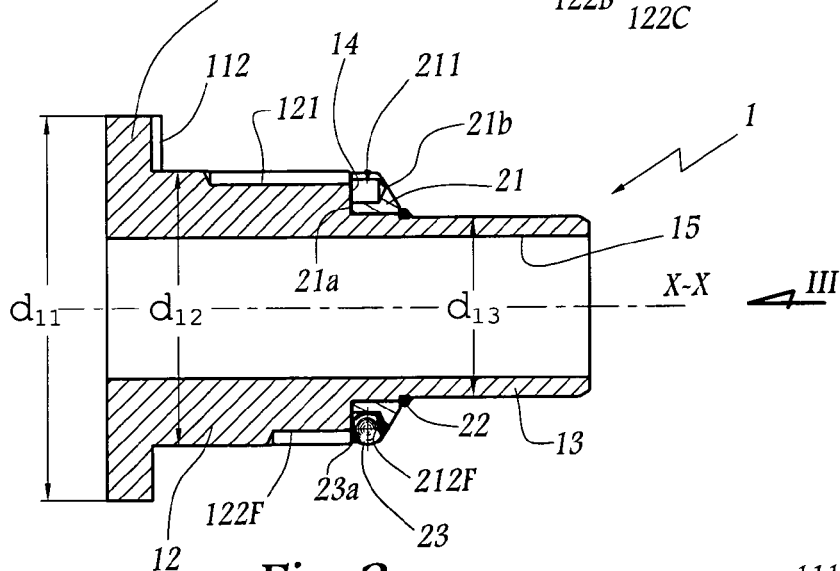
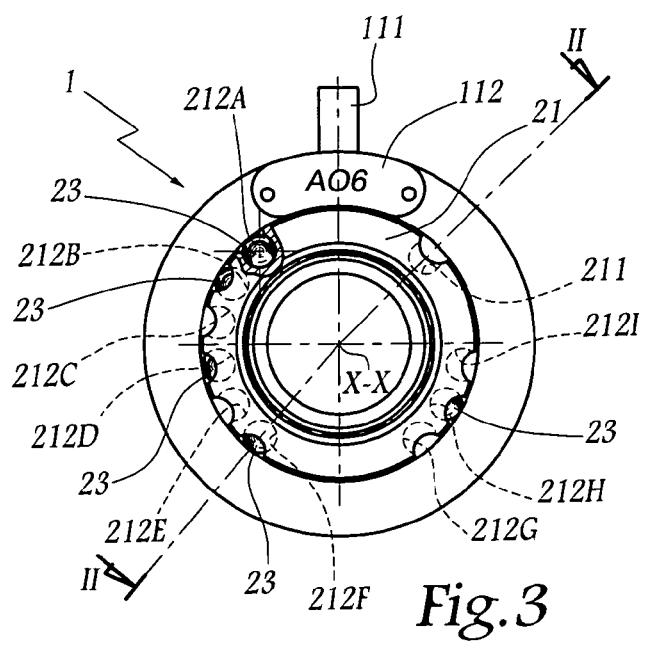

CONNECTORS WITH ADJUSTABLE ELEMENTS TO PREVENT UNDESIRED COUPLING OF ADJACENT CONDUITS

BACKGROUND OF THE INVENTION

The present invention relates to a connection for the removable junction of pipes or the like, as well as to a method for joining such a connection.

DESCRIPTION OF THE RELATED ART

It is known to supply machines, or more generally installations, with fluids and/or electricity with a view to actuating or controlling these installations. Such supply is effected through pipes interrupted at the level of connections allowing removable re-assembly thereof and thus the temporary supply of the installation.

For an installation comprising numerous points of junction, it is conventional for a plurality of connections having substantially the same overall dimensions to be used successively. However, it is important not to mix the fluids and/or the electricity supplying the installation, which might lead to damage and/or incorrect functioning thereof. This is why it is known to mark the supply connections by easily memorized alphanumerical references and/or colors.

Another solution consists in equipping the different connections of the same installation with coding means adapted to pair, by complementary shapes, the two elements of a given connection, provided to be fitted in each other. An example of such coding means is given in DE-B-1187435. In this document, depending on the nature of the fluid intended to circulate in an associated connection, one of the elements of this connection is provided with a plurality of catches extending in a direction transverse to the direction of fit of the connection, in accordance with a configuration associated with the fluid, while the other element is provided with a corresponding number of slots substantially complementary to these catches so as to make it possible to place the two elements end to end. When it is attempted to fit two non-paired elements in each other, at least one of the catches of the first element is not able to be introduced in a corresponding slot, thus preventing an incorrect connection.

Although these catches and slots are efficient for preventing mistakes in the connections, they present the drawback of being expensive and difficult to make since each element of each connection must be custom-machined. Moreover, the user of these connections must have available at least one spare for each element of each connection in case one of these elements were damaged, this requiring a large stock of elements.

Another example of coding means is given in DE-A-2646063. In this document, a system of coding catches and slots substantially similar to that of DE-B-1187435 is employed, with which is associated a single rib/groove couple intended to angularly index the two elements of the connection to be fitted in each other. The connection proposed by DE-A-2646063 proves to be restrictive to use as, in the event of difficulty to fit two connections in each other, the operator does not know whether he is attempting to connect two non-paired elements or whether, although manipulating two paired connection elements, he is angularly positioning these elements adequately.

Furthermore, for installations located in dangerous environments, such as sites for reprocessing nuclear waste or for demolishing nuclear power plants, these operations of connection are generally effected remotely, by means of robots which manipulate the elements to be connected and cameras which transmit to the operator more or less clear images of the movements of these robots. Under these conditions, the risks of the operator accidentally inverting the paired elements of different connections are very high. In addition, coding means such as those proposed in DE-B-1187435 are unsuitable from the standpoint of operating performance as they do not present a sufficient mechanical resistance to the efforts developed by the manipulating robots, accentuating the problems of cost and of stock set forth hereinabove. Moreover, the difficulty of using the connection elements of DE-A-2646063 mentioned above is all the greater due to the slowness and lack of sensitivity of the manipulating robots, and to the poor visibility.

It is an object of the present invention to propose a removable connection which, while facilitating the admissible junctions and by avoiding the incorrect junctions of the elements of this connection, limits the associated stock and manufacturing requirements. The invention also advantageously proposes to guarantee a more convenient use and a greater resistance of the connection having regard to manipulation by robots or the like, which are less sensitive than a human operator.

SUMMARY OF THE INVENTION

To that end, the invention relates to a connection for the removable joining of two pipes or the like, that includes two elements adapted to be fitted in each other along an axis of fit and a no-mistake means carried by the two elements and adapted to pair the two elements by complementary shapes. The connection also includes means for angularly indexing the two elements, carried by the two elements and adapted to position the two elements angularly with respect to each other before the no-mistake means, at least partly connected to the two elements in removable and configurable manner, cooperate with one another during the joining of these elements.

Because of the no-mistake means which are configurable, i.e. of which the number and/or location of the components may be freely chosen by the user, the two elements of a given connection are paired in situ or upon delivery. In other words, the user needs to have in situ only a small stock of maintenance parts allowing him to configure the two standard connection elements previously machined in mass production, as desired. Similarly, the supplier need to provide only a reduced stock of connection elements, which he then configures easily and rapidly when requested, by the no-mistake means. During their manipulation, possibly by a robot, the connection elements are easily positioned angularly with respect to each other before the no-mistake means are under strain. In this way, the operator is assured that, at the moment when he tests the complementary shapes of the parts of the no-mistake means, respectively, carried by the two elements, these two elements were previously correctly arranged angularly by the indexing means.

According to other characteristics of this connection, taken separately or in all technically possible combinations,
  the no-mistake means comprise:
    at least one element in relief adapted to be removably connected to a first of the two elements;
    for each element in relief, a zone of passage of the element in relief during fit of the elements, carried by the second element; and
    means for selectively obturating each zone of passage, adapted to be removably connected to the second element.

Further, each element in relief has an elongated shape along the axis of fit. Also, each zone of passage is defined at least in part by a part removably added on the second element.

The obturation means comprise, for each zone of passage to be obturated, an associated obturator, particularly in the form of a ball, the zone of passage being in the form of a cavity for axial reception and radial and ortho-radial immobilization of the obturator.

The obturation means define at least one bearing surface on the second element which opposes a movement in a direction substantially parallel to the axis of fit.

The indexing means includes at least one element in relief secured to the first element and of which at least a part is offset, along the axis of fit, with respect to the or each element in relief ensuring a mistake free connection.

The two elements are in tubular form and an outer face of one of the elements is stepped in a manner substantially complementary to a stepped inner face of the other element, with the result that, when the elements are joined with one another, these stepped faces cooperate to ensure the two elements are substantially coaxial.

The invention also relates to a method for joining two elements with one another along an axis of fit, these elements being of tubular shape and having no-mistake means adapted to permit the two elements to be connected by complementary shapes and means for angularly indexing the two elements, this method being characterized by the following successive steps during which:

the two elements are brought closer to each other by positioning them proximate one another, for example visually, possibly with the aid of a camera, or in a predetermined relative movement, in particular in accordance with pre-programmed instructions for controlling a robot manipulating the elements;

the two elements are engaged one around the other, rendering them substantially coaxial by cooperation of the stepped outer face of one of the elements with the complementary shaped inner face of the other;

one of the elements is adjusted in rotation about the axis of fit with respect to the other until the parts of the angular indexing means respectively carried by the elements cooperate with each other;

one of the elements is displaced, in a rectilinear movement parallel to the axis of fit, with respect to the other until the parts of the no-mistake means, respectively, carried by these two elements cooperate with each other, and if the respective parts of the no-mistake means are complementary with respect to each other, the rectilinear displacement of one of the elements with respect to the other is continued in the same direction.

According to an advantageous additional characteristic of this method, during the step of approach of the two elements, one of the elements is approximately positioned angularly with respect to the other by observing, substantially along the axis of fit, a sighting member carried by one of the elements with respect to an associated catch carried by the other element.

BRIEF DESCRIPTION OF THE DRAWINGS

The invention will be more readily understood on reading the following description given by way of non-limiting example and made with reference to the accompanying drawings, in which:

FIG. 1 is an exploded view in perspective of a male element of a connection according to the invention.

FIG. 2 is a view in longitudinal section of the male element of FIG. 1, in the assembled state.

FIG. 3 is a view in elevation in the direction of arrow III indicated in FIG. 2, the plane of section of FIG. 2 being noted II-II in FIG. 3.

DESCRIPTION OF PREFERRED EMBODIMENT

Figure 7:
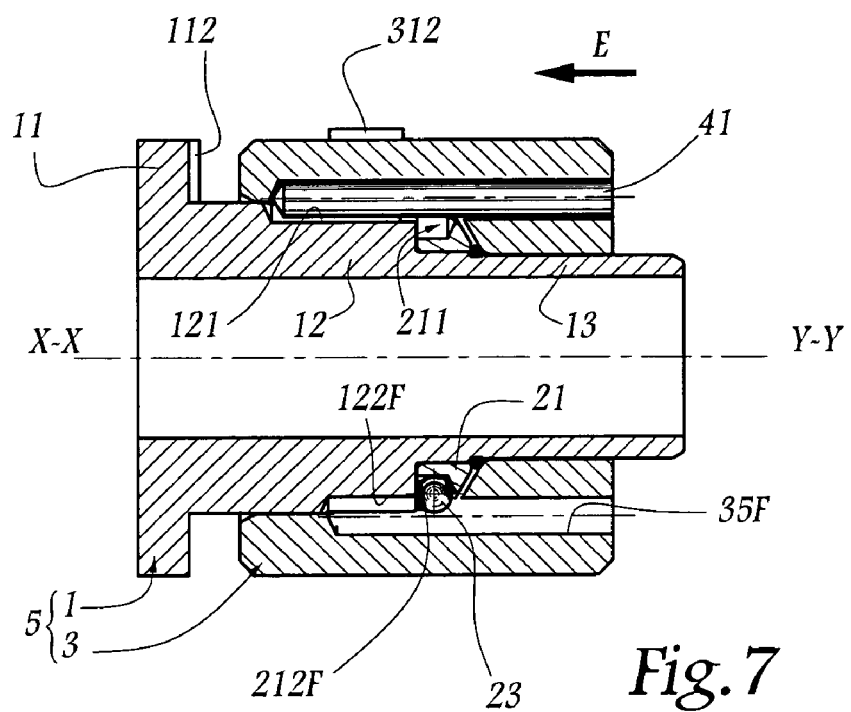
FIG. 7 is a view similar to FIGS. 2 and 5, illustrating the fit of the male part of FIGS. 1 to 3 in the female part of FIGS. 4 to 6.

Referring now to the drawings, FIGS. 1 to 3 show a male element 1 of a connection 5 shown in FIG. 7. This male element 1 presents a globally tubular shape of longitudinal axis X-X. It is intended internally to receive cables, electrical connectors, channels for fluid or the like (not shown), adapted to be connected in tight and/or insulated manner to respectively complementary components during the junction of the connection 5 set forth in detail hereinafter.

The following description of FIGS. 1 to 3 will be given, for convenience, considering that the "rear" direction corresponds to that directed towards the left in FIGS. 1 and 2, the "front" direction being the opposite. In this way, FIG. 3 corresponds to the front face of the element 1.

The male element 1 comprises a globally cylindrical body with circular base, of axis X-X, composed of three successive stepped parts. This body thus comprises a rear end flange 11, a cylindrical running part 12 and a cylindrical front part 13, with decreasing respective outer diameters $d_{11}$, $d_{12}$ and $d_{13}$, the shoulder formed between the parts 12 and 13 being referenced 14. Over the whole of its length, this body is traversed right through by a central bore 15 of substantially constant diameter and provided to house the cables, connectors and/or channels mentioned hereinabove.

The end flange 11 is provided, at one point of its periphery, with a catch 111 projecting radially outwardly, as well as with an identification plaque 112 bearing the alpha-numerical reference "A06".

The outer surface of the running part 12 has a plurality of longitudinal grooves hollowed out therein, of which the respective rear ends are blind and whose respective front ends open out on the outside at the level of the shoulder 14. Among these grooves, one groove, referenced 121, is distinguished, which is longer than the other identical grooves, nine in number and respectively referenced 122A, 122B, . . . , 122I. In transverse section, the grooves 121 and 122A to 122I each present a profile in the form of an arc of circle.

The male element 1 is provided to be equipped with an annular ring 21, or washer, to be added in coaxial manner around the front part 13. More precisely, this ring 21 presents an inner diameter substantially equal to the outer diameter of the front part 13 and an outer diameter substantially equal to that of the running part 12. It is provided to be fitted around the part 13 until its rear face 21a comes into axial abutment against the shoulder 14, a ring 22 for forward axial retention being added in a corresponding annular groove hollowed out in this part 13.

Over its periphery, the ring 21 has a plurality of identical cavities hollowed out therein, all opening out both on the rear (21a) and front (21b) faces of the ring and on the outer peripheral edge of the ring. When the ring 21 is added on the male element 1, these cavities are provided to be arranged in axial extension of the grooves 121 and 122A to 122I, with the result that each front end of these grooves opens out directly in one of these cavities. Consequently, among these cavities, one cavity 211 is distinguished, disposed in line with the groove 121 and nine other cavities 212A to 212I respectively disposed in line with the grooves 122A to 122I. In order to guarantee that each cavity is correctly in line with its associated groove when the ring 21 is added on the male element 1, the rear face 21a is for example provided with an axially projecting stud 213 (FIG. 1) intended to fit in a corresponding blind housing axially hollowed out in the shoulder 14.

The cavities 212A to 212I of the ring 21 are adapted to be able each to receive an obturation ball 23. For the male element 1 of FIGS. 1 to 3, five of these nine cavities, namely cavities 212A, 212B, 212D, 212F and 212H thus receive a ball 23.

In transverse section, the contour of the cavities 212A to 212I is provided to follow the shape, in substantially complementary manner, of the circular contour of the balls 23 over more than 180°, so as thus to immobilize the ball both in a radial direction and all the ortho-radial directions with respect to axis X-X. Moreover, the rear side of each cavity is more open than its front side so as to be able to introduce a ball 23 freely in the cavity from the rear face 21a of the ring 21, in a rectilinear trajectory substantially parallel to axis X-X, indicated by arrow 24 in FIG. 1, while preventing this ball from escaping via the front. When the ring 21 is added on the male element 1, the balls 23 disposed in the cavities 212A, 212B, 212D, 212F and 212H are in axial abutment against the shoulder 14, the diameter of these balls being substantially equal to the axial dimension of the cavities.

Figure 4:
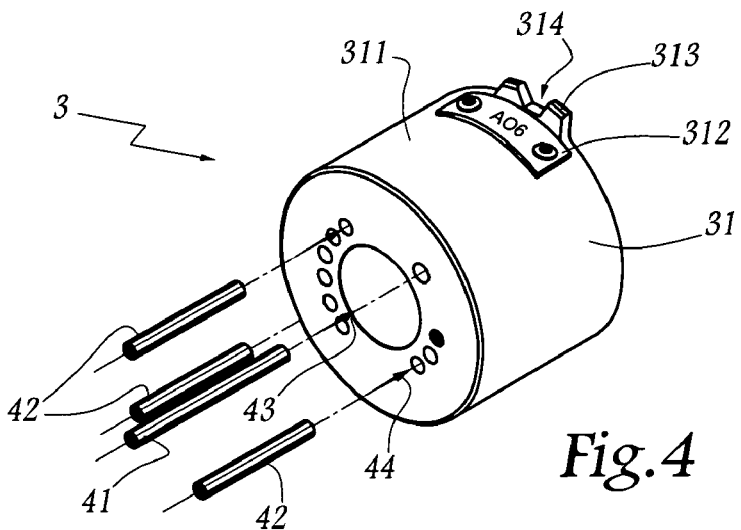
FIG. 4 is a view similar to FIG. 1 of a female element of the connection according to the invention paired with the male element of FIG. 1.
Figure 5:
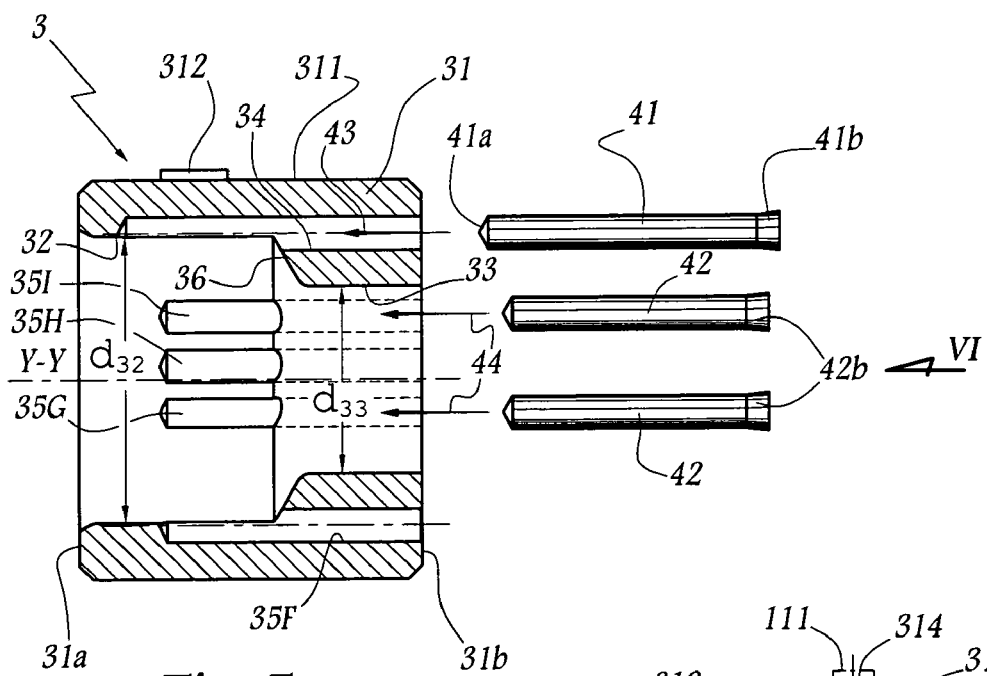
FIG. 5 is a longitudinal section of the female element of FIG. 4, in a non-assembled state.
Figure 6:
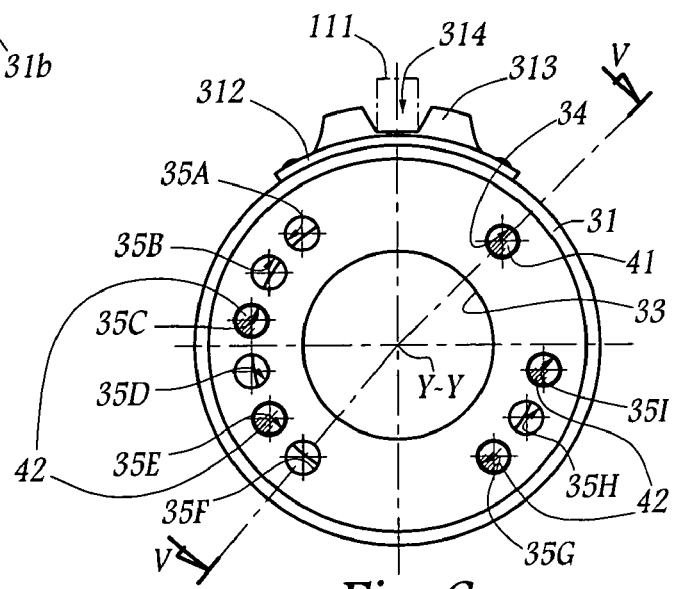
FIG. 6 is a view in elevation in the direction of arrow VI indicated in FIG. 5, with the female element in the assembled state, the plane of section of FIG. 5 being noted V-V in FIG. 6.

FIGS. 4 to 6 show a female element 3 of the connection 5 of FIG. 7, presenting a globally tubular shape, of axis Y-Y. The male element 1 of FIGS. 1 to 3 and the female element 3 of FIGS. 4 to 6 are intended to be fitted in each other thanks to a relative movement of approach globally parallel to their axis X-X and Y-Y, as explained in detail hereinafter.

For convenience, the following description of FIGS. 4 to 6 will be given, considering that the "front" direction corresponds to the direction directed towards the reader of FIG. 4 and directed towards the right in FIG. 5, the "rear" direction being in opposite direction. In this way, FIG. 6 corresponds to the front face of the element 3.

The female element 3 comprises a tubular body 31 presenting a substantially cylindrical outer face 311 with circular base, of axis Y-Y and with a diameter substantially equal to the outer diameter $d_{11}$ of the end flange 11 of the male element 1. This outer face 311 is provided both with an identification plaque 312 bearing alpha-numerical reference "A06" and with a sighting member 313. This sighting member 313 comprises two identical arms projecting from the face 311, disposed one behind the other over the periphery of the body 31 and defining therebetween a sighting space 314 of U-shaped cross section. The base of this space 314 presents a peripheral dimension substantially equal to the diameter of the catch 111 of the end flange 11.

Internally, the body 31 of the female element 3 defines over the whole of its length a stepped bore constituted by a rear part 32 and a front part 33, both cylindrical with circular base, of axis Y-Y and connected to each other by a flared zone of transition 36. The inner diameter $d_{33}$ of the front part 33 is strictly less than the inner diameter $d_{32}$ of the rear part 32 and is substantially equal to the outer diameter $d_{13}$ of the front part 13 of the body of the male element 1, while the inner diameter $d_{32}$ of the rear part 32 is substantially equal to the outer diameter $d_{12}$ of the running part 12 of the male element.

The body 31 likewise has hollowed out therein a plurality of cylindrical orifices 34, 35A to 35I, with circular base, of respective axes parallel to axis Y-Y and whose front ends open out freely on the front face 31b of the body 31, while their rear ends are blind. In transverse section, the axes of these orifices are arranged in a circle centered on axis Y-Y and of diameter substantially equal to the inner diameter of the rear bored part 32, with the result that the rear parts of these orifices open out radially in this rear part 32, the length of the orifices being greater than that of the front bored part 33. Moreover, these orifices are distributed, in transverse section, in manner similar to grooves 121 and 122A to 122I.

Among the aforementioned orifices, one orifice 34 is distinguished, of length greater than the other orifices, nine in number and respectively referenced 35A to 35I.

These orifices 34 and 35A to 35I are adapted each to receive and removably immobilize a substantially complementary pin. More precisely, for the female element 3 shown, the orifice 34 receives a pin 41, as indicated by arrow 43, while the orifices 35C, 35E, 35G and 35I each receive an identical pin 42, of length less than the pin 41, as indicated by arrows 44. Each of these pins 41 and 42 presents an outer diameter substantially equal to the inner diameter of the corresponding orifices, except at the level, for example, of their front end 41b, 42b (i.e. their end located at the level of the front face 31b of the body 31 when the pins are received entirely in the corresponding orifices) which presents a slightly greater outer diameter. Consequently, the front ends 41b, 42b of these pins form respective surfaces for removable wedging inside the orifices 31.

The junction of the male element 1 of FIGS. 1 to 3 with the female element 3 of FIGS. 4 to 6 will now be described, considering for example that this operation of junction is effected by means of a robot manipulating the female element 3 while the male element 1 is already, for example at the level of its rear face, firmly connected to a console or a machine (not shown).

At the start, the female element 3 is totally independent of the male element 1. By means of the aforementioned robot, possibly equipped with an on-board camera, the operator brings the female element towards the male element and firstly positions it approximately at the end of the male element, with a view to introducing the front part 13 of the element 1 in the rear bore 32 of the element 3, without for the time being seeking to fit them in each other. A visual comparison of the references of the identification plaques 112 and 312 allows the operator to be sure that the two elements are, a priori, correctly paired.

While then observing these elements globally along axis X-X, the operator rotates the female element 3 about its axis Y-Y so that the catch 111 of the end flange 11 of the male element 1 is disposed substantially at the center of the sighting space 314 defined by the sighting member 313 of the female element. This relative position of the catch 111 is shown in phantom lines in FIG. 6. In this configuration, the user knows that the elements 1 and 3 are roughly positioned angularly in suitable manner with respect to each other.

He then controls the robot in a direction E substantially parallel to axis X-X and directed towards the rear, so that the rear part 32 of the central bore of the body 31 of the female element 3 engages around the front part 13 of the body of the male element 1. Even if the relative radial positioning between the elements 1 and 3 is only approximate, the difference between the outer dimension of this front part 13 and the inner dimension of this rear part 32 is sufficient for this first movement of axial approach to be effected without difficulty. Moreover, the flared zone of transition 36 guides the female element radially during its axial movement of approach and the rear zones of the parts 32 and 33 are respectively centered on the front zones of the parts 12 and 13 so that axes X-X and Y-Y merge. In other words, the cooperation of the stepped outer face of the male element and the stepped inner face of the female element enables these elements to be rendered coaxial.

While continuing this axial approach movement, the robot brings the rear end 41a of the pin 41 against the front face 21b of the ring 21, in that case preventing the fit of the elements 1 and 3 from being continued. Insofar as this contact is made in a direction substantially parallel to axis X-X and the parts in contact are firmly retained in this direction, the low capacity of detection of the contact by the robot, i.e. its "sensitivity", compared to a human operator is not prejudicial to the elements to be connected.

The operator then orders the robot to rotate the female element 3 about its axis Y-Y again, while maintaining a rearward drive control of this element until the pin 41 engages inside the cavity 211 and the groove 121. To that end, the operator works by trial and error knowing that, by the prior visual location by means of the catch 111 and the sighting member 313, the pin 41 is in practice disposed, at least angularly, approximately in line with this groove 121. In this state, the radial positioning of the elements 1 and 3 is itself ensured by the cooperation both of the rear bored part 32 of the female element 3 with the running part 12 of the male element 1 and of the front bored part 33 with the front part 13.

Once the rear end 41a of the pin 41 is engaged in the front end of the groove 121, the female element 3 is angularly and radially indexed with respect to the male element 1 so that its orifices 35A to 35I are respectively disposed exactly in axial line with the grooves 122A to 122I of the male element.

The user then controls the axial approach towards the rear E of the female element with respect to the male element again until the rear ends 42a of the pins 42 arrive axially at the level of the ring 21. Insofar as the cavities 212C, 212E, 212G and 212I are not obturated by balls 23, the pins 42 pass through these cavities and the axial movement of introduction of the female element about the male element is continued without being hindered up to the blind rear ends of these grooves. The elements 1 and 3 are then in the configuration of FIG. 7, i.e. fitted in each other, implying the connection and/or coupling of the different cables, connectors or fluid channels (not shown) disposed inside these elements.

Once this fit is effected, reversible locking means (not shown) may be provided to connect the elements 1 and 3 firmly to each other.

It will thus be understood that the combined presence of the pins 42, of the cavities 212A, 212B, 212D, 212F and 212H obturated by the balls 23 and of the other cavities 212C, 2212E, 212G and 212I allowing the passage of the pins 42 when the elements 1 and 3 are fitted, ensures the correct pairing between the male and female elements of the connection to be obtained. These components make it possible, to some extent, to obtain a no-mistake key whose verification is effected solely along the axial movement E between the male and female elements. Consequently they constitute a guarantee of safety in addition to the simple visual comparison of the identification plaques 112 and 312, which may be forgotten or difficult to make when the junction of the connection takes place is remotely, with camera, with reduced visibility or in an encumbered environment.

Figure 8:
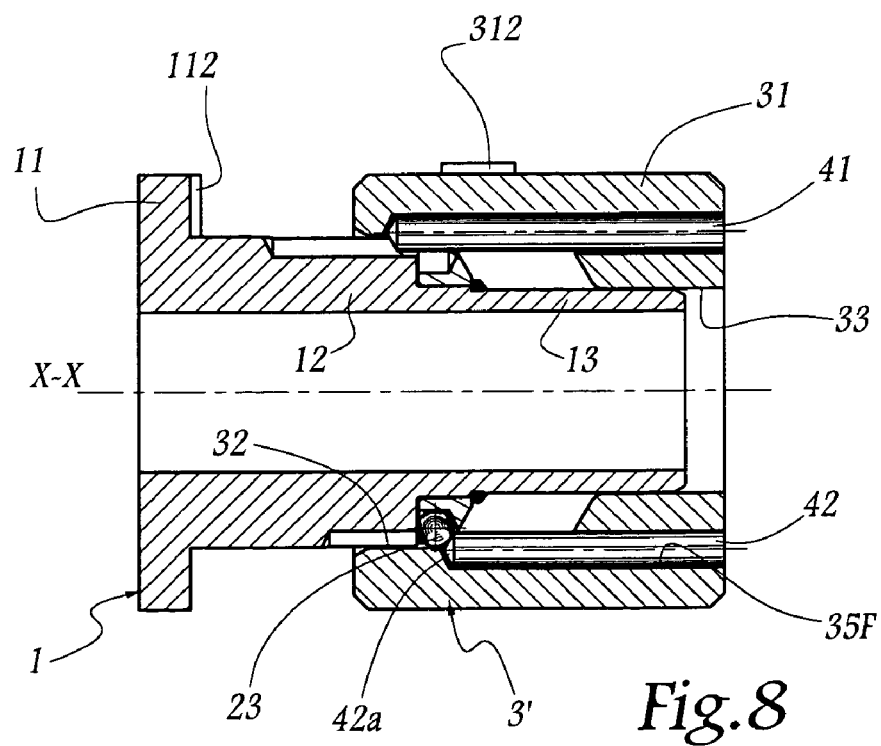
FIG. 8 is a view similar to FIG. 7, illustrating the fit of the male part of FIGS. 1 to 3 in a non-paired female element.

To illustrate this point, FIG. 8 shows the male element 1 of FIGS. 1 to 3 and a female element 3' not paired with the male element 1. This female element 3' comprises the same body 31 as the female element 3 but, unlike element 3, comprises an additional pin 42 inside the orifice 35F of the body 31. When it is attempted to fit the element 3' around element 1 while their angular and radial positioning has already been effected by means of the indexing pin 41 as explained hereinabove, the rear end 42a of the additional pin 42 comes into axial abutment against the ball 23 disposed in the cavity 212F of the ring 21, as shown in the lower part of FIG. 8. It is in that case impossible to continue the relative axial displacement of these elements. It will be noted that the prevention of this approach is, in that case, solely ensured by the cooperation of the additional pin 42 and the ball 23 of the cavity 212F, this constituting an efficient and resistant blocking since a part of the outer surface 23a of this ball is in axial abutment against the shoulder 14 of the body of the male element 1. The no-mistake means used are therefore adapted for the manipulation of the elements to be connected by robots or the like which a priori do not risk damaging these elements by reason of their low sensitivity.

Insofar as the ring 21 is removable with respect to the body of the male element and the pins 42 are removably connected to the body of the female element, it is easy and rapid for the user to configure the no-mistake state of these bodies of male and female elements as desired, so as to set up a plurality of connections with inherent configuration. By way of example, with the nine possibilities of obturation by the balls 23 and the nine possibilities of implantation of the pins 42, one hundred and twenty six possible no-mistake configurations can be envisaged.

Various arrangements and variants of the connection 5 described hereinabove may also be imagined.

As the cooperation of the pin 41 and of the associated groove 121 is essentially intended to allow the relative angular positioning of the male and female elements during their fit, it is not necessary that the corresponding cavity 211 of the ring 21 be geometrically identical to the cavities 212A to 212I, since this cavity 211 is a priori not intended to receive a ball 23.

Other means for removably connecting the pins 42 to the body 31 of the female element 3 may be envisaged; by way of example, it may be provided that these pins bear an outer threading complementary of a tapping provided in the orifices 35A to 35I, or that these pins be force-fitted in the orifices 35A to 35I, each being blocked at their front end, with respect to the female element 3 by a circlips or the like.

The grooves 122A to 122I/pins 42 arrangement may be inverted with respect to the male (1) and female (3) elements.

As the pins of configuration 42 are "read" at the ring 21, i.e. are tested as to their possibility of passing through the cavities 212A to 212I on condition that these latter are not obturated, it is not necessary to provide, for each pin, an inherent groove 122A to 122I, all these grooves being able, on the contrary, to be replaced by a single peripheral hollowing of the running part 12 of the male element 1, which would extend, in transverse section, over an arc corresponding to the arc which connects the groove 122A to the groove 122I, passing through the other grooves.

The form of the configurable elements in relief may be different than the configuration of the pins 42 described hereinabove. For example, these elements in relief may be constituted by studs removably connected to the female element 3 so as to extend, in length, in a radial direction with respect to axis Y-Y, with one end of each stud in radial projection from the inner face of the body 31.

Similarly, forms of configurable obturators other than the balls 23 are possible; for example, in place of the cavities 212A to 212I, the ring 21 may be axially traversed by cylindrical housings distributed over its periphery at the same locations as the cavities 212A to 212I and removable plugs would then be provided to obturate the aforementioned cylindrical housings, particularly by being introduced therein via the rear face 21a of the ring while the latter is not yet added on the male element 1. According to yet another embodiment of the invention, associated in particular with the variant example of the configurable elements in relief described hereinabove, the configurable obturators are directly connected individually to the male element 1, without using the ring 21; in that case, the body of the male element 1 directly defines the zones of passage of the pins 42 during fit of the elements 1 and 3, functionally similar to cavities 212A to 212I and the obturators are in that case provided to selectively stop certain of these zones of passage, being for example screwed in the body of the male element 1 so that an end part of the obturators extend across the zones of passage selected, particularly in a radial direction with respect to axis X-X.

What is claimed is:

1. A connection for the joining of two pipes, comprising: two connector elements adapted to be fitted, one within the other, along an axis of fit (X-X) so that said two connector elements effectively join the two pipes only if a plurality of projecting members that are carried by a first of said two connector elements are not prevented from being cooperatively and fully receivable within open zones of passage of a second of said two connector elements in which said projecting members are selectively receivable during a complete joining of said two connector elements by blocking means associated with said second connector element, said blocking means being selectively removably connected to said second connector element so as to be positioned to block at least one of the zones of passage to thereby prevent said plurality of projecting members from seating within the zones of passage and such that said first and second connector elements can not be completely joined to one another, indexing means including a first projection carried by one of said two connector elements and being of a size to initially engage with the other of said two connector elements as they are being moved toward one another in a direction of fit before said projecting members engage with said second of said two connector elements, said first projection being receivable within at least one first opening within the other of said two connector elements when engaging said other of said two connector elements and as said two connector elements are angularly indexed in relative rotation with respect to one another so as to thereby align said projecting members so as to be potentially receivable within said open zones of passage of said second of said two connector elements, said projecting members being removable and selectively mounted in at least some of a plurality of predetermined positions relative to said first of said two connector elements prior to said two connector elements being urged toward one another, whereby when said two connector elements are urged toward a position of being completely joined after said projecting members are aligned to be potentially receivable within said open zones of passage of said second of said two connector elements, such complete joining is prevented if at least one of the plurality of projecting members is not mounted in a correct one of the predetermined positions and is blocked by a blocking means from being completely received within an opposing open zone of passage of said second of said two connector elements.

2. The connection of claim 1, wherein the zones of passage are aligned with openings in a part removably mounted to said second connector element.

3. The connection of claim 1, wherein, for each zone of passage to be blocked, said blocking means is seated and radially immobilized within a cavity aligned with the zone of passage to be blocked.

4. The connection of claim 1, wherein said blocking means engages at least one bearing surface on said second connector element, said at least one bearing surface opposing a movement of said blocking means in a direction substantially parallel to the axis of fit.

5. The connection of claim 1, wherein said first projection of said indexing means includes at least one elongated pin element carried by said first connector element.

6. The connection of claim 1, wherein each of said two connector elements is tubular in form and wherein an outer face of one of said two connector elements is stepped in a manner substantially complementary to a stepped inner face of the other of said two connector elements, with the result that, when said two connector elements are fitted, one within the other, said stepped faces cooperate to align said two connector elements substantially coaxially.

7. The connection of claim 1, wherein each of said two connector elements is tubular in form and wherein an outer face of one of said two connector elements is stepped in a manner substantially complementary to a stepped inner face of the other of said two connector elements, with the result that, when said two connector elements are fitted one within the other, said stepped faces cooperate to align said two connector elements substantially coaxially.

8. The connection of claim 6, including a sighting element carried by one of said two connector elements and a sighting catch carried by the other of said two connector elements such that said two connector elements may be visually axially aligned with one another.

9. The connection of claim 1 including a sighting element carried by one of said two connector elements and a second sighting catch carried by the other of said two connector elements such that said two connector elements may be visually axially aligned with one another.

10. The connection of claim 2 wherein said blocking means are balls which are selectively positioned within said openings, and said part being a ring in which the openings are formed.

11. The connection of claim 1, wherein said projecting members are pins of a first length and said first projection of said indexing means is a pin having a length greater than the first length.

12. The connection of claim 3 wherein the zones of passage are formed as grooves in said second connector element.

13. The connection of claim 1, wherein each of said projecting members extends generally parallel to the axis of fit.

* * * * *